United States Patent [19]

Schweickert et al.

[11] Patent Number: 4,609,169
[45] Date of Patent: Sep. 2, 1986

[54] PROPELLANT TANK RESUPPLY SYSTEM

[75] Inventors: Thomas F. Schweickert, Collinsville, Ill.; George F. Orton, St. Louis, Mo.

[73] Assignee: The United States of America as represented by the Secretary of the Air Force, Washington, D.C.

[21] Appl. No.: 640,636

[22] Filed: Aug. 14, 1984

[51] Int. Cl.⁴ .................... B64D 37/14; B64G 1/26
[52] U.S. Cl. .................. 244/169; 244/135 C; 244/135 R; 244/172; 60/734; 137/255
[58] Field of Search ............ 60/734; 137/255, 25 C; 244/135 R, 135 B, 135 C, 158 R, 172, 169, 162

[56] References Cited

U.S. PATENT DOCUMENTS

| | | | |
|---|---|---|---|
| 2,818,915 | 1/1958 | Pfeiffer | 137/255 |
| 3,097,480 | 7/1963 | Sohn | 60/35.5 |
| 3,231,223 | 1/1966 | Upper | 244/52 |
| 3,231,224 | 1/1966 | Koelle | 244/52 |
| 3,369,771 | 2/1968 | Walley et al. | 244/162 |
| 3,537,669 | 11/1970 | Modesti | 244/23 |
| 3,756,024 | 9/1973 | Gay | 60/204 |
| 3,977,633 | 8/1976 | Keigler et al. | 244/169 |
| 4,288,051 | 9/1981 | Goschel | 244/169 |
| 4,451,017 | 5/1984 | Marshall | 244/172 |
| 4,505,124 | 3/1985 | Mayer | 244/135 R |

FOREIGN PATENT DOCUMENTS 2537544  6/1984  France .................. 244/158 R

*Primary Examiner*—Galen Barefoot
*Attorney, Agent, or Firm*—Donald J. Singer; Bobby D. Scearce

[57] ABSTRACT

A novel propellant resupply system for, and method of recharging the propellant tanks of, the attitude control system (ACS) of a spacecraft or the like are described, comprising first and second propellant conduits respectively interconnecting the outlets of the fuel and oxidizer pump inducers of the primary propulsion system with the fuel and oxidizer tanks for the ACS thruster engines, and controller valves within each propellant conduit for controllably diverting fuel and oxidizer under pressure from the fuel and oxidizer pumps to the thruster fuel and oxidizer tanks during operation of the primary propulsion system engines.

6 Claims, 2 Drawing Figures

PROPELLANT TANK RESUPPLY SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in attitude control systems (ACS) for spacecraft and more particularly to a novel propellant tank resupply system and method for increasing ACS propellant usage capability through resupply of the ACS tanks during operation of the engines of the primary propulsion system.

An increasing demand is being experienced for the deployment of large, heavy satellites into high energy earth orbits. Anticipated propulsion requirements for placing the spacecraft and other associated payloads of planned missions into geosynchronous orbits far exceed the capabilities of existing orbit transfer stages. The shuttle orbiter may be used for most missions in order to place satellites into low earth orbit; auxiliary propulsion stages on the satellites may then be used to transfer the satellites into operating earth orbits. Upon achieving its operating orbit, however, a satellite will require additional propulsive energy for station keeping, three-axis attitude control, and threat evasion.

Because future satellite systems will likely be characterized by substantial payload weights, new high-performance, pump-fed rocket engines will be included in many of the associated propulsion systems for orbital maneuvering. The ACS for each orbiting satellite could, however, employ off-the-shelf pressure-fed thrusters to minimize system costs and to improve operational reliability. Due to the difference in operating inlet pressures for the primary propulsion system engines as compared to the ACS thruster inlet pressures in existing systems, large low-pressure propellant storage tanks would be used for the pump-fed main propulsive engines, while small high-pressure propellant tanks or accumulators would be used for the pressure-fed ACS thrusters.

A problem associated with this propulsion system approach is that of providing sufficient ACS propellant capacity to satisfy mission uncertainties. The ACS propellant requirements are difficult to predict in advance, and this problem is compounded by the required long on-orbit stay times (7-10 years) anticipated for future satellites. Enhanced mission flexibility could be achieved in future satellites using the ACS propellant tank resupply method described herein.

The present invention provides a propellant tank resupply system which may be used to resupply the ACS thruster engines on a satellite. During primary engine burnoff, satellite propellants (fuel and oxidizer) are tapped off the respective turbopump inducer exits for recharging the separate ACS fuel and oxidizer propellant tanks. The resupply system of the present invention obviates the need for additional high pressure storage tanks for pressurizing the ACS propellant tanks.

It is, therefore, a principal object of the present invention to provide an improved attitude control system for a spacecraft.

It is a further object of the invention to provide a system and method for recharging the propellant tanks of the attitude control system of a spacecraft.

It is yet another object of the invention to provide a system and method for replenishing under pressure the propellant tanks of the attitude control system of a spacecraft.

These and other objects of the present invention will become apparent as the detailed description of certain representative embodiments thereof proceeds.

SUMMARY OF THE INVENTION

In accordance with the foregoing principles and objects of the present invention, a novel propellant resupply system for, and method of recharging the propellant tanks of, the attitude control system (ACS) of a spacecraft or the like are described, comprising first and second propellant conduits respectively interconnecting the outlets of the fuel and oxidizer pump inducers of the primary propulsion system with the fuel and oxidizer tanks for the ACS thruster engines, and controller valves within each propellant conduit for controllably diverting fuel and oxidizer under pressure from the fuel and oxidizer pumps to the thruster fuel and oxidizer tanks during operation of the primary propulsion system engines.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
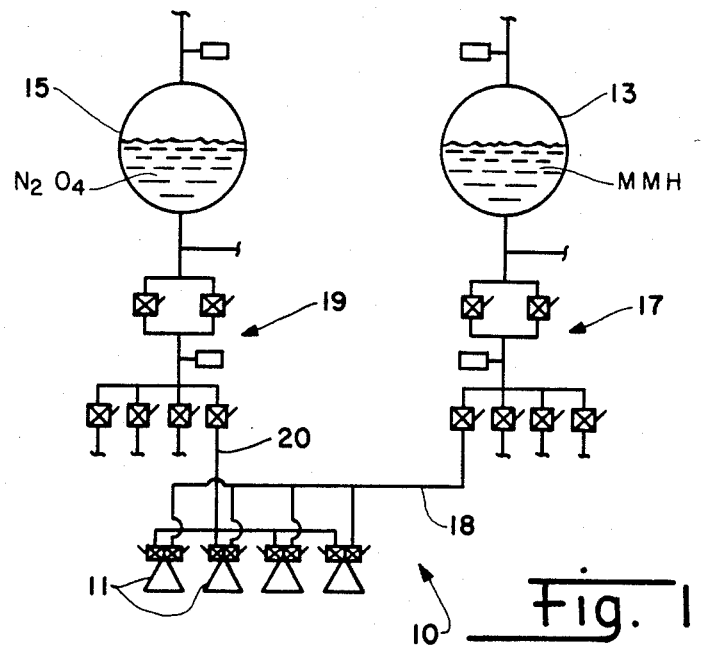
FIG. 1 is a schematic illustration of an attitude control system for an orbiting space vehicle into which the propellant tank resupply system of the present invention may be incorporated.

Referring now to the accompanying drawings, FIG. 1 illustrates schematically an attitude control system (ACS) for an orbiting spacecraft or like vehicle into which the propellant tank resupply system of the present invention may appropriately be incorporated. The primary propulsion system for the vehicle into which the ACS shown in FIG. 1 may be incorporated may typically comprise a pump-fed, bipropellant system utilizing monomethyl hydrazine (MMH) fuel and nitrogen tetroxide ($N_2O_4$) oxidizer for propulsion with a plurality (usually four) of gimballed pump-fed engines, and including a common helium supply for propellant tank pressurization, turbine spin-up, and valve actuation, and refillable trap propellant acquisition devices. Accordingly, as shown in FIG. 1, the ACS 10 may comprise a blowdown, pressure-fed, bipropellant system utilizing MMH and $N_2O_4$, including a plurality of pressure-fed thrusters 11 (e.g., 16 Marquardt R4-D or like engines) for vernier maneuvering and three-axis control of the vehicle. Any low-pressure propellant storage system for supplying ACS 10 may therefore be interconnected with the fuel system of the primary propulsion system of the vehicle, and may comprise a fuel tank 13 for containing MMH fuel, and an oxidizer tank 15 for containing $N_2O_4$. It should be understood at the outset, however, that the teachings herein are not limited to the named fuel and oxidizer materials, as the principles governing the operation of the ACS and the novel resupply system described herein may be applied to systems utilizing other propulsion reactants, as would occur to one with skill in the field of the invention; for example, alternative reactants may include hydrazine ($N_2H_4$) and $N_2O_4$, liquid hydrogen and liquid oxygen, or liquid methane and liquid oxygen.

Propellant reactant tanks 13,15 normally operate in a blowdown mode over a pressure range of from about 315 to about 160 psia for both the fuel and the oxidizer, which may be fed to the thrusters 11 through separate respective control systems 17,19. For the representative system suggested in FIG. 1, the corresponding pressures within the fuel and oxidizer inlet lines 18,20 range from about 300 psia to about 150 psia during blowdown. During blowdown, the thrust on each engine 11 will decay from about 135 to about 85 $lb_f$ and the mixture ratio will vary from about 1.62 to about 1.68. Delivered total impulse for the system may be in the range of about 60,000 $lb_f$-sec.

Figure 2:
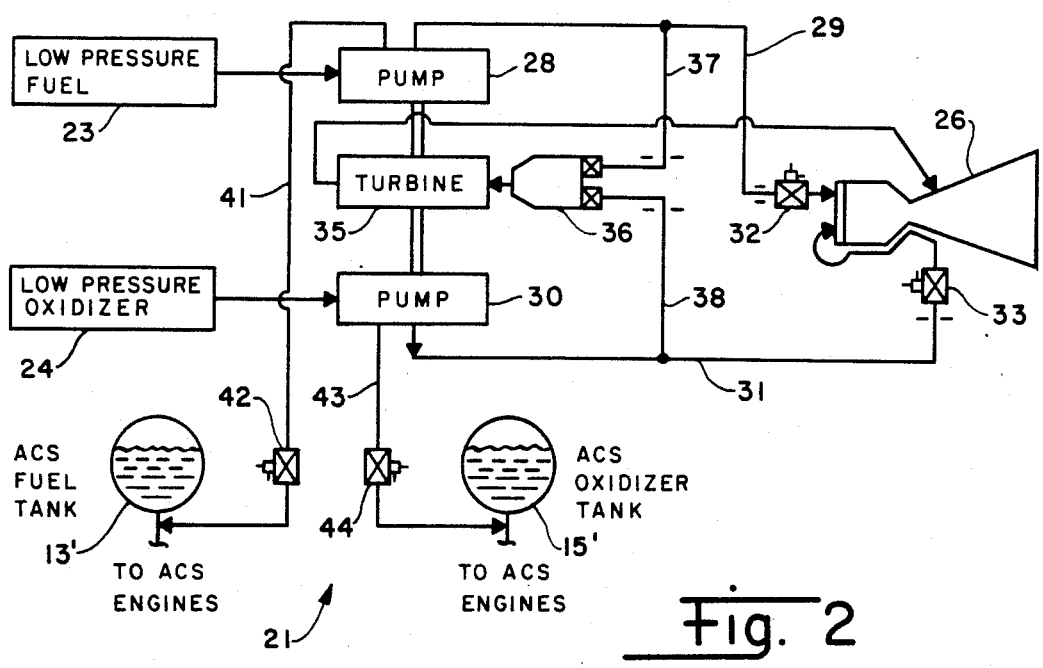
FIG. 2 is a schematic illustration of the novel propellant tank resupply system of the present invention which may be used in conjunction with the system of FIG. 1.

For substantially increased operational versatility of the ACS system, the novel propellant tank resupply system 21 of the present invention shown schematically in FIG. 2 may be incorporated into the ACS system 10 suggested in FIG. 1 for operation in conjunction with the primary fuel and propulsion systems of the vehicle. Accordingly, resupply system 21 may be operatively interconnected with the low pressure fuel source 23 and low pressure oxidizer source 24 supplying propellant to engines 26 comprising the primary propulsion system for the vehicle. Turbopumps 28,30 provide the means to boost propellant pressure for fueling engines 26 to provide thrust for the vehicle, and are operatively connected through propellant flow lines 29,31 and controllers 32,33 to engines 26. Turbopumps 28,30 may be powered by turbine 35, which is driven by gas generator 36 in the power train of the primary propulsion system and fueled through fuel and oxidizer lines 37,38.

In the unconventional structure of the ACS propellant resupply system 21 of the present invention, tapoff lines or conduits 41,43 may be operatively connected to the exits of the inducers on turbopumps 28,30 in order to divert, respectively, pressurized fuel and oxidizer for resupply of the ACS fuel and oxidizer tanks 13',15' through controllers or other valve means 42,44 suggested in FIG. 2. The ACS propellant tanks 13',15' may therefore be selectively resupplied during primary engine 26 burns by suitable control of the flow of pressurized fuel and oxidizer from the turbopump inducer exits through tapoff lines 41,43. The inducer exit pressures (about 315 psia for both fuel and oxidizer) are sufficient to recharge the ACS tanks 13',15' within about 100 seconds with only two primary engines 26 (of the four in the propulsion system of the example represented in the drawings) operating.

For illustrative purposes, propellant capacities, operating pressures, and thrust levels are given in Table I for the ACS and primary engine systems of the representative embodiment of FIGS. 1 and 2. As indicated in Table I, the ACS propellant tanks operate in a blowdown mode, and are preliminarily loaded to about 50% capacity and pressurized with helium to about 315 psia. As propellants are expended, the tank pressure decays to about 160 psia at a near empty condition. The propellant resupply rates are a function of ACS tank pressure, but for inducer exit pressures of 315 psia and ACS tank pressures of 160 psia, the resupply rates are 0.715 lbm/sec of $N_2O_4$ and 0.435 lbm/sec of MMH.

TABLE I

| | ACS | Primary Engine System |
|---|---|---|
| Propellant wt (lb) | | |
| Fuel (MMH) | 87 | 15,073 |
| Oxidizer ($N_2O_4$) | 143 | 30,072 |
| Propellant tank press (psia) | 315-160 (blowdn) | 49 (regulated) |
| Pump inlet press (psia) | — | 37 |
| Pump inducer exit press (psia) | — | 315 |
| Pump exit press (psia) | | |
| Fuel | — | 2011 |
| Oxidizer | — | 2363 |
| Thruster inlet press (psia) | 300-150 | — |
| Thrust level per engine ($lb_f$) | 135-85 | 3750 |

The present invention, as hereinabove described, therefore provides a novel propellant tank resupply system and method for recharging the propellant tanks of the ACS system of such as an orbiting spacecraft wherein propellants (fuel and oxidizer) are tapped off the turbopump inducer exits of the primary propulsion system engines during primary engine burn and controllably fed to the ACS propellant tanks. The ACS tank resupply system and method as described may be applicable to any propulsion system using pump fed engines, and offers substantial advantages over existing systems, including reduction of the required weight and volume of the ACS tanks, the capability to tailor the impulse expenditure between primary engines and ACS thrusters to meet specific mission requirements, and the elimination of a requirement for additional dedicated ACS resupply pumps.

It is understood that certain modifications to the invention may be made, as might occur to one with skill in the field of this invention, within the scope of the appended claims. Therefore, all embodiments contemplated hereunder which achieve the objectives of the invention have not been shown in complete detail. Other embodiments may be developed without departing from the spirit of this invention or from the scope of the appended claims.

We claim:

1. In an attitude control system for a spacecraft or the like having a primary propulsion system including at least one primary engine, a source of fuel and a source of oxidizer, and separate fuel pump means and oxidizer pump means for pressurizing fuel and oxidizer for burning in said at least one primary engine, said attitude control system including at least one thruster engine and a pressurized fuel supply tank and a pressurized oxidizer supply tank for supplying fuel and oxidizer to said thruster engine, an improvement, comprising:
  a. first conduit means operatively connected at one end to the outlet of said fuel pump means and at the other end to the thruster engine fuel supply tank;
  b. second conduit means operatively connected at one end to the outlet of said oxidizer pump means and at the other end to the thruster engine oxidizer supply tank; and
  c. control valve means within each said first and second conduit means for controllably diverting, respectively, fuel and oxidizer under pressure from said fuel and oxidizer pump means to said thruster engine fuel and oxidizer supply tanks during operation of said at least one primary engine whereby the thruster engine fuel and oxidizer supply tanks are resupplied under pressure during said operation of said at least one primary engine.

2. The improvement as recited in claim 1 wherein said fuel pump means and said oxidizer pump means each comprises a turbopump inducer.

3. The improvement recited in claim 1 wherein said source of fuel and said source of oxidizer comprise, respectively, monomethyl hydrazine and nitrogen tetroxide.

4. A method for recharging the propellant tanks of an attitude control system of a spacecraft or the like having a primary propulsion system including at least one primary engine, a source of fuel and a source of oxidizer, and separate fuel pump means and oxidizer pump means for pressurizing fuel and oxidizer for burning in said at least one primary engine, said attitude control system including at least one thruster engine and a pressurized fuel supply tank and pressurized oxidizer supply tank for supplying fuel and oxidizer to said thruster engine, said method comprising the steps of:

a. providing first and second conduit means, said first conduit means operatively connected at one end to the outlet of said fuel pump means and at the other end to the thruster engine fuel supply tank, and said second conduit means operatively connected at one end to the outlet of said oxidizer pump means and at the other end to the thruster engine oxidizer supply tank; and b. controllably diverting fuel and oxidizer, respectively, through said first and second conduit means from said fuel pump means and said oxidizer pump means to the thruster fuel and oxidizer supply tanks during operation of said primary engine whereby the thruster engine fuel and oxidizer supply tanks are recharged under pressure during said operation of said primary engine.

5. The method as recited in claim 4 wherein said fuel pump means and said oxidizer pump means each comprises a turbopump inducer.

6. The method recited in claim 4 wherein said source of fuel and said source of oxidizer comprise, respectively, monomethyl hydrazine and nitrogen tetroxide.

* * * * *